(12) United States Patent
Michaels et al.

(10) Patent No.: US 12,445,266 B2
(45) Date of Patent: Oct. 14, 2025

(54) GALOIS EXTENSION FIELD-BASED BLOCK CIPHER

(71) Applicant: VIRGINIA TECH INTELLECTUAL PROPERTIES, INC., Blacksburg, VA (US)

(72) Inventors: Alan J. Michaels, Blacksburg, VA (US); Kiernan B. George, South Riding, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 82 days.

(21) Appl. No.: 18/287,547

(22) PCT Filed: Apr. 19, 2022

(86) PCT No.: PCT/US2022/071794
§ 371 (c)(1),
(2) Date: Oct. 19, 2023

(87) PCT Pub. No.: WO2022/226491
PCT Pub. Date: Oct. 27, 2022

(65) Prior Publication Data
US 2024/0187213 A1 Jun. 6, 2024

Related U.S. Application Data

(60) Provisional application No. 63/176,513, filed on Apr. 19, 2021.

(51) Int. Cl.
*H04L 29/00* (2006.01)
*H04L 9/06* (2006.01)

(52) U.S. Cl.
CPC .......... *H04L 9/0637* (2013.01); *H04L 9/0656* (2013.01)

(58) Field of Classification Search
CPC ............................ H04L 9/0637; H04L 9/0656
(Continued)

(56) References Cited

U.S. PATENT DOCUMENTS

| 4,322,577 A | 3/1982 | Brandstrom |
| 2009/0279688 A1* | 11/2009 | Michaels .............. H04L 9/0668 380/28 |
| 2015/0086007 A1 | 3/2015 | Matthew et al. |

OTHER PUBLICATIONS

Jason M. McGinthy and Alan J. Michaels, Lightweight internet of things Encryption Using Galois Extension field arithmetic, 2018, IEEE, pp. 74-80 (Year: 2018).*

(Continued)

*Primary Examiner* — Jeffrey C Pwu
*Assistant Examiner* — Michael D Anderson
(74) *Attorney, Agent, or Firm* — Thomas | Horstemeyer, LLP

(57) ABSTRACT

Various examples are provided related to a block cipher adaptation of the Galois Extension Fields (GEF) combination technique. In one example, a GEF-based block encryption includes forming an output from a PRNG into a key matrix, where the key matrix is formatted as an invertible square matrix; applying a GEF operation to the key matrix to map elements to a closed subset in a higher-order GEF space; mapping plaintext to a plaintext matrix; applying a GEF operation to the plaintext matrix to map elements to the higher-order GEF space; combining the plaintext matrix and the key matrix to produce a vector of ciphertext in the higher-order GEF space; reducing the vector to a reduced vector of ciphertext using an inverse of the GEF operation; and during the reducing, applying a ceiling operation to bijectively map elements in the reduced vector to a closed subset. Another example includes GEF-based block decryption.

22 Claims, 9 Drawing Sheets

(58) Field of Classification Search
USPC .......................................................... 713/189
See application file for complete search history.

(56) References Cited

OTHER PUBLICATIONS

International Search Report for PCT/US2022/071794 mailed Jul. 8, 2022.

McGinthy, et al., "Lightweight Internet of Things Encryption using Galois Extension Field Arithmetic", 2018 IEEE Confs on Internet of Things and IEEE Green Computing and Communications and IEEE Cyber, Physical and Social Computing and IEEE Smart Data, Aug. 3, 2018.

Michaels, et al., "PRNG sequence combination techniques via Galois extension fields", MILCOM 2017-2017; IEEE Military Communications Conference, IEEE Oct. 2017.

George, et al., "Designing a block cipher in galois extension fields for IoT security", MDPI, Nov. 5, 2021.

Wang, et al., "On statistical distance based testing of pseudo random sequences and experiments with PHP and Debian OpenSSL", ScienceDirect, Computers and Security, Jun. 2, 2015.

* cited by examiner

Algorithm 1: InvertibleMatrixGF($n$, $k$, seq) - Algorithm for generating an invertible matrix under a Galois Field

Input: $n$: matrix order (n × n),
$k$: width of input/output,
seq: PRNG object
Output: $A$: invertible matrix,
$B$: inverse of $A$
$A \leftarrow$ matrix of 0s sized $n \times n$;
for $i \leftarrow 0$ to $n - 1$ do
    for $j \leftarrow i$ to $n - 1$ do
        $A[i][j] = ((2 * \text{seq.nextOutput}()) + 1)$;
    end
end
$B = \text{ExtendedEuclidean}(|A| \pmod{2^{k+1}}, 2^{k+1}) * \text{Adjoint}(A) \pmod{2^{k+1}}$;
for $i \leftarrow 0$ to $n - 1$ do
    for $j \leftarrow i$ to $n - 1$ do
        $A[i][j] = (A[i][j] - 1)/2$;
    end
end

FIG. 3

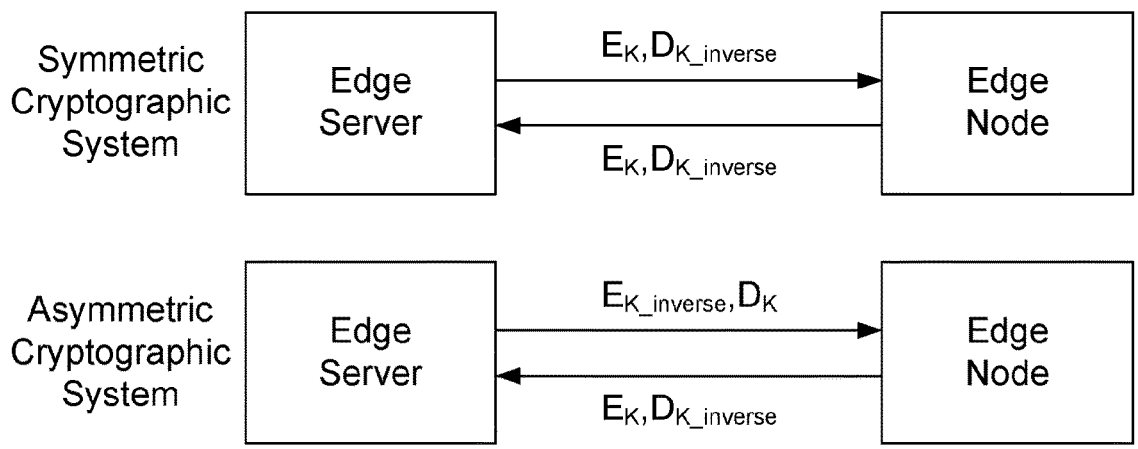

FIG. 4

Table 1: NIST STS Results on 1000 1000-bit Samples

|  | ECB Mode | CFB Mode | Stream Mode |
|---|---|---|---|
| Frequency | 99.6% | 99.1% | 99.1% |
| Block Frequency | 99.5% | 98.6% | 98.9% |
| Cumulative Sums | 99.4% | 99.3% | 99.2% |
| Runs | 99.5% | 98.8% | 99.0% |
| Longest Run | 99.3% | 99.2% | 99.0% |
| FFT | 98.1% | 98.6% | 98.0% |
| Approx. Entropy | 100% | 100% | 100% |
| Serial | 98.6% | 99.2% | 98.2% |

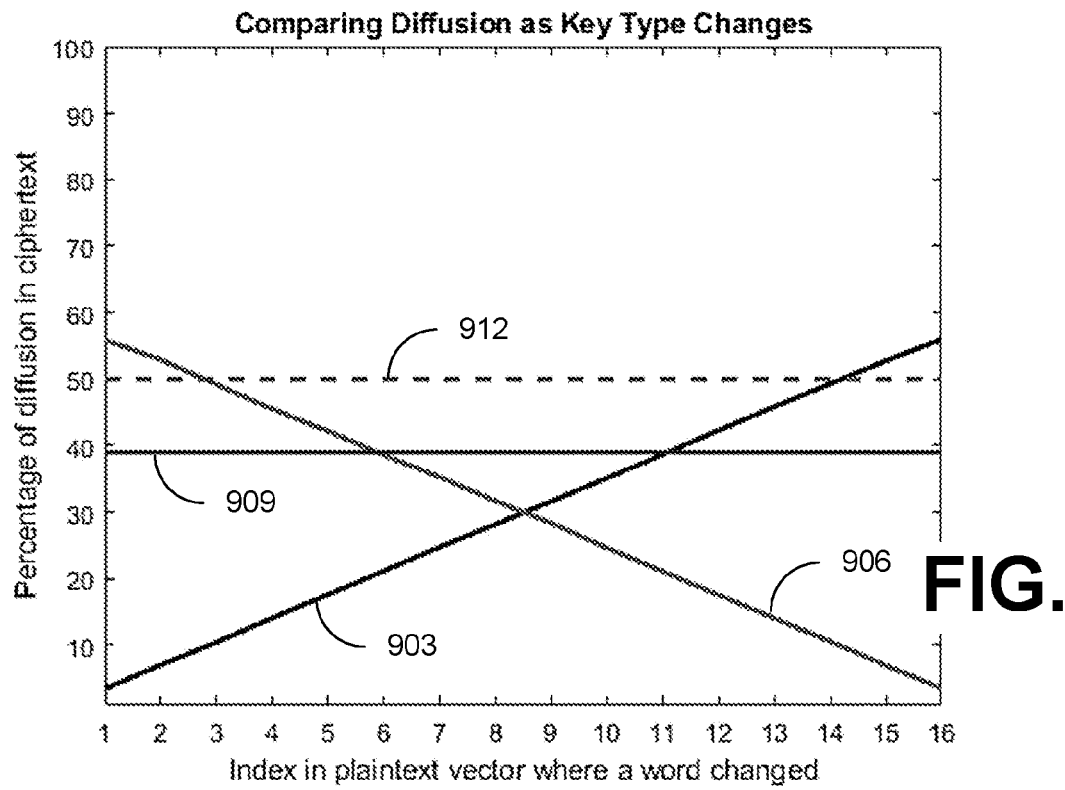
FIG. 9A
| $n \backslash i$ | 1 | $n/2$ | $n$ |
|---|---|---|---|
| 4 | 13.94% | 28.02% | 55.68% |
| 8 | 7.08% | 28.12% | 55.78% |
| 16 | 3.54% | 28.12% | 56.09% |
Table 2: Shannon diffusion rates for different values of $n$ in ECB mode.
FIG. 9B
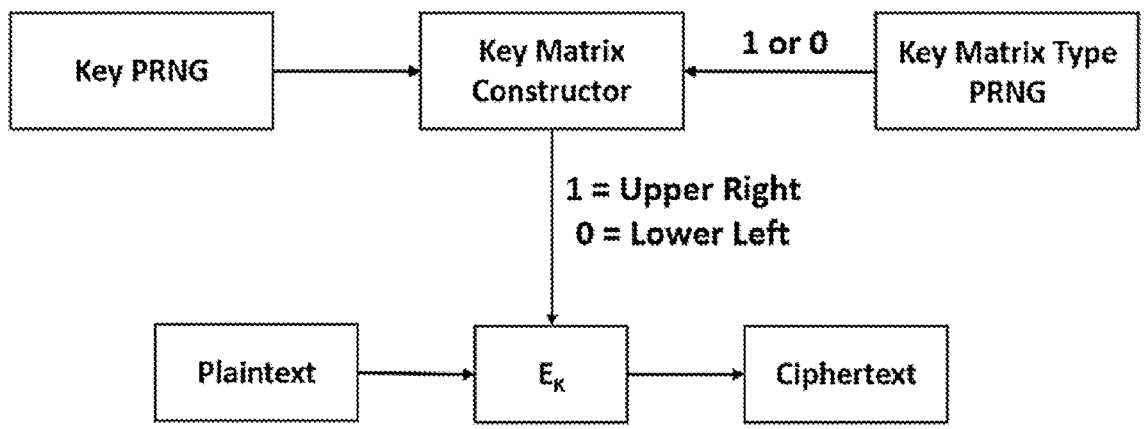
FIG. 10

|  | Stream | ECB | CFB | AES |
|---|---|---|---|---|
| $E_K$ Time (mS) | 1.167 | 0.981 | 3.43 | 6.379 |
| $E_K$ Energy ($\mu$J/byte) | 0.155 | 0.458 | 2.344 | 0.884 |
| $D_K$ Time (mS) | N/A | 7.84 | 77.9 | 8.12 |
| $D_K$ Energy ($\mu$J/byte) | N/A | 3.52 | 33.42 | 1.125 |

Table 3: Computation time and energy consumption for encryption and decryption operations on the TI MSP430FR5994.

GALOIS EXTENSION FIELD-BASED BLOCK CIPHER

CROSS REFERENCE TO RELATED APPLICATIONS

This application is the 35 U.S.C. § 371 national stage application of PCT Application No. PCT/US2022/071794, filed Apr. 19, 2022, which claims priority to, and the benefit of, U.S. provisional application entitled "GALOIS EXTENSION FIELD-BASED BLOCK CIPHER", having Ser. No. 63/176,513, filed Apr. 19, 2021, which are both hereby incorporated by reference herein in their entireties.

BACKGROUND

The use of Internet-of-Things (IOT) devices has become increasingly popular due to their cheap mass-manufacturing costs and ease of use. Generally, this classification describes any single-purpose computer that wirelessly communicates to a network of similar devices. Some common examples in the consumer space include home-automation devices such as smart lights, plugs, and motion sensors. However, they are being applied in more fields than home automation, such as the industrial and medical spaces. Due to the diverse network of devices and broad application space, the standardization of IoT protocols and hardware is limited. Low size, weight, power, cost (SWaP-C), and time-to-market are the fundamental drivers of no/low security in IoT. These challenges lead to little security or use of custom protocols that are not widely accepted and validated. Since IoT devices are single-purpose sensors or actuators in many cases, they are manufactured with cheap, slow processors. Any security system implemented towards protecting IoT communication will be constrained to fit these capabilities.

SUMMARY

Aspects of the present disclosure are related to block cipher adaptation of the Galois Extension Fields (GEF) combination technique. In one aspect, among others, a GEF-based block encryption process comprises synchronizing a random number generator (RNG), wherein the RNG is a pseudo-random number generator (PRNG); forming an output from the PRNG into a key matrix, wherein the key matrix is formatted as an invertible square matrix; applying a Galois Extension Field (GEF) operation to the key matrix, to map elements of the key matrix from a Galois field space order $GF(p^k)$, where p is a prime number, to a closed subset in a higher-order Galois extension field space; mapping plaintext to a plaintext matrix; applying a GEF operation to the plaintext matrix, to map elements of the plaintext matrix from the order $GF(p^k)$ to the higher-order Galois extension field space; combining the plaintext matrix and the key matrix using extension field matrix multiplication, to produce a vector of ciphertext in the higher-order Galois extension field space; reducing the vector of ciphertext from the higher-order Galois extension field space to a reduced vector of ciphertext in the order $GF(p^k)$ using an inverse of the GEF operation; and during the reducing, applying a ceiling operation to bijectively map elements in the reduced vector of ciphertext to a closed subset in the order $GF(p^k)$.

In one or more aspects, the higher-order Galois extension field space can be of order $GF(p^{k+1})$. p can be 2 and the process can comprise optimizing subsequent Galois Extension Field computations in a digital computational framework to an odd subset of $GF(2^{k+1})$. In various aspects, the encryption process can comprise partitioning the plaintext to conform to a block size for encryption. The encryption process can comprise padding the plaintext to conform to a block size. The encryption process can comprise operating the process in Electronic Codebook (ECB) mode, in Cipher Feedback Mode (CFB) or in Cipher Block Chain (CBC) mode. In some aspects, the key matrix can be selected as an upper triangular square matrix or a lower triangular square matrix. The key matrix can be (a) alternated, (b) randomly selected between upper and lower triangular matrices between code blocks, or (c) a composition of upper and lower triangular matrices.

In another aspect, a GEF-based block decryption process comprises synchronizing a random number generator (RNG), wherein the RNG is a pseudo-random number generator (PRNG); forming an output from the PRNG into a key matrix, wherein the key matrix is formatted as an invertible square matrix; applying a Galois Extension Field (GEF) operation to the key matrix, to map elements of the key matrix from a Galois field space order $GF(p^k)$, where p is a prime number, to a closed subset in a higher-order Galois extension field space; inverting the key matrix to an inverted key matrix; extending a vector of ciphertext from the order $GF(p^k)$ to the higher-order Galois extension field space using the GEF operation; combining the vector of ciphertext and the inverted key matrix using extension field matrix multiplication, to produce a vector of plaintext in the higher-order Galois extension field space; and reducing the vector of plaintext from the higher-order Galois extension field space to the order $GF(p^k)$ using an inverse GEF operation.

In one or more aspects, the higher-order Galois extension field space can be of order $GF(p^{k+1})$. p can be 2 and the process can comprise optimizing subsequent Galois Extension Field computations in a digital computational framework to an odd subset of $GF(2^{k+1})$. In various aspects, the decryption process can comprise, after the reducing, applying a floor operation to bijectively map elements in a vector of plaintext to a closed subset in the order $GF(2^k)$. The decryption process can comprise removing padding from the recovered plaintext. The decryption process can comprise operating the process in Electronic Codebook (ECB) mode, in Cipher Feedback Mode (CFB) or in Cipher Block Chain (CBC) mode. In some aspects, the key matrix can be selected as an upper triangular square matrix or a lower triangular square matrix. The key matrix can be (a) alternated, (b) randomly selected between upper and lower triangular matrices between code blocks, or (c) a composition of upper and lower triangular matrices.

In another aspect, a GEF-based block encryption system comprises at least one processing device; and at least one memory device that stores computer-readable instructions thereon that, when executed by the at least one processing device, direct the at least one processing device to: synchronize a random number generator (RNG), wherein the RNG is a pseudo-random number generator (PRNG); form an output from the PRNG into a key matrix, wherein the key matrix is formatted as an invertible square matrix; apply a Galois Extension Field (GEF) operation to the key matrix, to map elements of the key matrix from a Galois field space order $GF(p^k)$, where p is a prime number, to a closed subset in a higher-order Galois extension field space; map plaintext to a plaintext matrix; apply a GEF operation to the plaintext matrix, to map elements of the plaintext matrix from the order $GF(p^k)$ to the higher-order Galois extension field space; combine the plaintext matrix and the key matrix using extension field matrix multiplication, to produce a vector of ciphertext in the higher-order Galois extension field space;

reduce the vector of ciphertext from the higher-order Galois extension field space to a reduced vector of ciphertext in the order $GF(p^k)$ using an inverse of the GEF operation; and during the reduction of the vector of ciphertext, apply a ceiling operation to bijectively map elements in the reduced vector of ciphertext to a closed subset in the order $GF(p^k)$.

In one or more aspects, the higher-order Galois extension field space can be of order $GF(p^{k+1})$. p can be 2, and the at least one processing device can be directed to optimize subsequent Galois Extension Field computations in a digital computational framework to an odd subset of $GF(2^{k+1})$. In various aspects, the at least one processing device can be directed to partition the plaintext to conform to a block size for encryption. The at least one processing device can be directed to pad the plaintext to conform to a block size. The at least one processing device can be directed to operate in Electronic Codebook (ECB) mode, in Cipher Feedback Mode (CFB) or in Cipher Block Chain (CBC) mode. In some aspects, the key matrix can be selected as an upper triangular square matrix or a lower triangular square matrix. The key matrix can be (a) alternated, (b) randomly selected between upper and lower triangular matrices between code blocks, or (c) a composition of upper and lower triangular matrices.

In another aspect, a GEF-based block decryption system comprises at least one processing device; and at least one memory device that stores computer-readable instructions thereon that, when executed by the at least one processing device, direct the at least one processing device to: synchronize a random number generator (RNG), wherein the RNG is a pseudo-random number generator (PRNG); form an output from the PRNG into a key matrix, wherein the key matrix is formatted as an invertible square matrix; apply a Galois Extension Field (GEF) operation to the key matrix, to map elements of the key matrix from a Galois field space order $GF(p^k)$, where p is a prime number, to a closed subset in a higher-order Galois extension field space; invert the key matrix to an inverted key matrix; extend a vector of ciphertext from the order $GF(p^k)$ to the higher-order Galois extension field space using the GEF operation; combine the vector of ciphertext and the inverted key matrix using extension field matrix multiplication, to produce a vector of plaintext in the higher-order Galois extension field space; and reduce the vector of plaintext from the higher-order Galois extension field space to the order $GF(p^k)$ using an inverse GEF operation.

In one or more aspects, the higher-order Galois extension field space can be of order $GF(p^{k+1})$. p can be 2 and the at least one processing device can be directed to optimize subsequent Galois Extension Field computations in a digital computational framework to an odd subset of $GF(2^{k+1})$. During the reduction of the vector of plaintext, the at least one processing device can be directed to apply a floor operation to bijectively map elements in a vector of plaintext to a closed subset in the order $GF(2^k)$. In various aspects, the at least one processing device can be directed to remove padding from the recovered plaintext. The at least one processing device can be directed to operate in Electronic Codebook (ECB) mode, in Cipher Feedback Mode (CFB) or in Cipher Block Chain (CBC) mode. In one or more aspects, the key matrix can be selected as an upper triangular square matrix or a lower triangular square matrix. The key matrix can be (a) alternated, (b) randomly selected between upper and lower triangular matrices between code blocks, or (c) a composition of upper and lower triangular matrices.

In another aspect, a non-transitory computer-readable medium can store computer-readable instructions thereon that, when executed by at least one processing device, direct the at least one processing device to: synchronize a random number generator (RNG), wherein the RNG is a pseudo-random number generator (PRNG); form an output from the PRNG into a key matrix, wherein the key matrix is formatted as an invertible square matrix; apply a Galois Extension Field (GEF) operation to the key matrix, to map elements of the key matrix from a Galois field space order $GF(p^k)$, where p is a prime number, to a closed subset in a higher-order Galois extension field space; map plaintext to a plaintext matrix; apply a GEF operation to the plaintext matrix, to map elements of the plaintext matrix from the order $GF(p^k)$ to the higher-order Galois extension field space; combine the plaintext matrix and the key matrix using extension field matrix multiplication, to produce a vector of ciphertext in the higher-order Galois extension field space; reduce the vector of ciphertext from the higher-order Galois extension field space to a reduced vector of ciphertext in the order $GF(p^k)$ using an inverse of the GEF operation; and during the reduction of the vector of ciphertext, apply a ceiling operation to bijectively map elements in the reduced vector of ciphertext to a closed subset in the order $GF(p^k)$.

In another aspect, a non-transitory computer-readable medium can store computer-readable instructions thereon that, when executed by at least one processing device, direct the at least one processing device to: synchronize a random number generator (RNG), wherein the RNG is a pseudo-random number generator (PRNG); form an output from the PRNG into a key matrix, wherein the key matrix is formatted as an invertible square matrix; apply a Galois Extension Field (GEF) operation to the key matrix, to map elements of the key matrix from a Galois field space order $GF(p^k)$, where p is a prime number, to a closed subset in a higher-order Galois extension field space; invert the key matrix to an inverted key matrix; extend a vector of ciphertext from the order $GF(p^k)$ to the higher-order Galois extension field space using the GEF operation; combine the vector of ciphertext and the inverted key matrix using extension field matrix multiplication, to produce a vector of plaintext in the higher-order Galois extension field space; and reduce the vector of plaintext from the higher-order Galois extension field space to the order $GF(p^k)$ using an inverse GEF operation.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 illustrates an example of an invertible matrix algorithm, in accordance with various embodiments of the present disclosure.

FIG. 4 illustrates a comparison between asymmetric (public key) and symmetric (shared private key) cryptosystems, in accordance with various embodiments of the present disclosure.

FIGS. 9A and 9B illustrate a comparison of diffusion and diffusion rates for ECB, CFB and stream modes, in accordance with various embodiments of the present disclosure.

FIG. 10 illustrates an example of an alternating key matrix construction, in accordance with various embodiments of the present disclosure.

DETAILED DESCRIPTION

Figure 1:
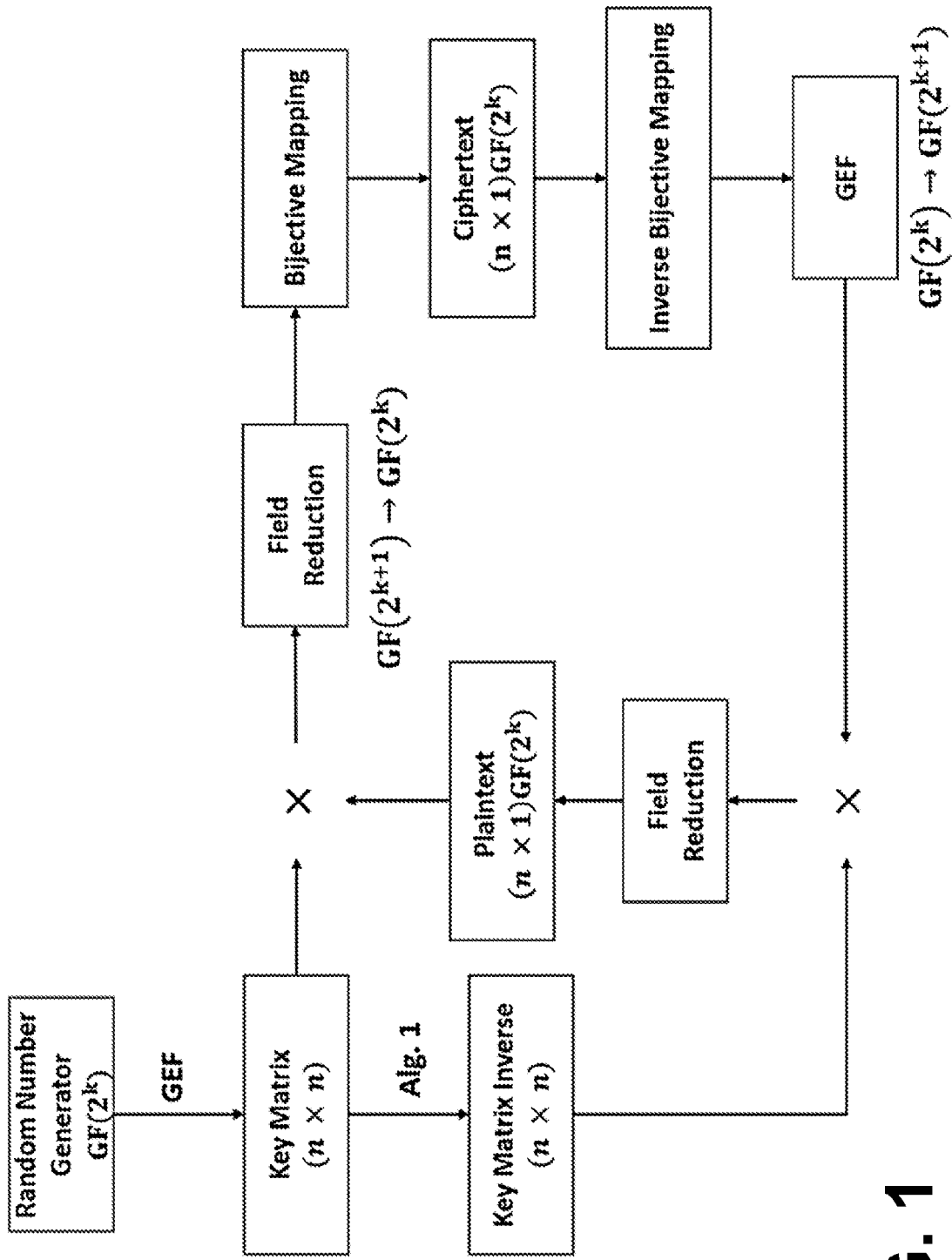
FIG. 1 illustrates an example of GEF-based encryption and decryption when operating in Electronic Codebook (ECB) mode, in accordance with various embodiments of the present disclosure.

Disclosed herein are various examples related to a block cipher adaptation of the Galois Extension Fields (GEF) combination technique for PRNGs and targets application in the Internet of Things (IOT) space, an area where the combination technique has been concluded as a quality stream cipher. Electronic Codebook (ECB) and Cipher Feedback (CFB) variations of the cryptographic algorithm are discussed. Both modes offer computationally efficient, scalable cryptographic algorithms for use over a simple combination technique like XOR. The cryptographic algorithm relies on the use of quality PRNGs but adds an additional layer of security while preserving maximal entropy and near-uniform distributions. The use of matrices with entries drawn from a Galois field extends this technique to block size chunks of plaintext, increasing diffusion, while only requiring linear operations that are quick to perform. The process of calculating the inverse differs only in using the modular inverse of the determinant, but this can be expedited by a look-up table. The GEF block cipher is validated with the NIST test suite. Additional statistical tests indicate the condensed plaintext results in a near-uniform distributed ciphertext across the entire field. The block cipher implemented on an MSP430 offers a faster, more power-efficient alternative to the Advanced Encryption Standard (AES) system. This cryptosystem is a secure, scalable option for IoT devices that must be mindful of time and power consumption. Reference will now be made in detail to the description of the embodiments as illustrated in the drawings, wherein like reference numbers indicate like parts throughout the several views.

Pseudorandom number generators (PRNGs) offer a cheap, efficient method at generating a seemingly random string of bits for use in cryptography. Some examples include linear feedback shift registers (LFSR), one-time pads, sequence precession, residue number systems, and chaotic maps. While not as strong as cryptographic systems like AES, they can be used in concert with other techniques on devices that need to prioritize speed and efficiency while maintaining reasonable levels of security for any data communication. IoT devices fall into this category, as many are single-purpose, and in some cases, run off battery power. Using stronger cryptographic protections is always preferred, but additional cheap techniques can be used in addition to ensure extracting the plaintext without the key is computationally infeasible. One assumption made here is that the attacker will understand everything about the cryptosystem except for the key, enforcing Kerckhoff's Principle: obscurity should not be used for security.

Traditionally, PRNGs are used in a stream cipher, which is a classification of cryptosystem that acts on a single word of plaintext at a time. On the other hand, a block cipher such as AES takes in a large block of plaintext and outputs an equally sized block of ciphertext. Traditional block cipher encryption algorithms employ methods of confusion and diffusion so minimal changes to the plaintext propagate throughout the ciphertext. Both categories of cryptographic systems offer generic, accepted techniques to strengthen the security, such as AES Cipher Feedback Mode (CFB), which treats previous ciphertext as a variable in the next iteration of the encryption algorithm. For stream ciphers, additional strategies have been developed to strengthen them, such as using a GEF approach to sequence combination rather than XOR. Another method uses the properties of matrices as an extension on stream ciphers or public key cryptosystems to strengthen the protocol while maintaining invertibility and providing third-party auditability.

A custom cryptosystem is described that can take in any input stream of variable size and combines the data with any PRNG's outputs in a block cipher format, which returns ciphertext of the same size. Decryption utilizes the inverse property of matrices when entries are taken from a Galois Field. The presented block cipher expands on the work done on Galois Extension Fields as a stream cipher combination technique and provides a block cipher framework to strengthen the security, while maintaining speed and efficiency for IoT applications. The mathematical theory behind the constructions used in the cryptosystem is presented, and matrix inverses are reintroduced and the requirements for invertibility are discussed. It is explained how some of the basic matrix arithmetic changes when the elements are from a finite field and the requirements for invertibility differ. A brief background and importance of Galois Extension Fields are discussed.

The structure of the cryptosystem, including initial assumptions and variables, a high-level system view of both ECB and CFB modes is then discussed, including pseudocode for computing the matrix inverse under a finite field. A basic numeric example is provided. Results based on a series of measurements used to judge the strength of the cryptosystem are presented, and these results are compared to the stream cipher variation and AES. The results of the NIST statistical test suite are compiled and displayed for each mode of this crytographic algorithm. Further analysis into diffusion and the Law of Iterated Logarithms tests are also provided. Hardware validation of the system is discussed.

Mathematical Background

Matrix and Finite Field Math. Given a square matrix A in $\mathbb{R}^{n \times n}$, where $\mathbb{R}^n$ is the collection of real numbers and n is a positive integer, the matrix is considered invertible if there exists an equally sized matrix B in $\mathbb{R}^{n \times n}$ that satisfies Equation 1.

$$AB = BA = I \quad (1)$$

The invertible matrix will further on be denoted as B. However, not all square matrices are invertible. The invertible matrix theorem describes a list of properties that a square matrix must meet to have an inverse, but this theorem can be condensed down to Equation 2, where $|A|$ is the determinant of matrix A.

$$|A| \neq 0 \quad (2)$$

In the context of this disclosure, the entries of the matrix A are from a finite field $\mathbb{Z}_m$, where m can be any positive integer. The invertible matrix theorem does not hold under this circumstance as all matrix operations are performed modulo m. While the process of calculating the inverse is the same, the matrix A in $\mathbb{Z}_m^{n \times n}$ must have a determinant that satisfies Equation 3, where gcd is the greatest common divisor function.

$$\gcd(|A|, m) = 1 \quad (3)$$

In the case of m being a prime, a matrix is invertible as long as the determinant is not equal to zero modulo m. The inverse in this case exists as long as the entries in the diagonal are not equal to zero modulo m; i.e., $|A|$ is not divisible by m. Matrices used for encryption and decryption operations in the block cipher are in a field where p is not necessarily prime. In this case, the set of invertible matrices in $\mathbb{Z}_m^{n \times n}$ is much smaller. Examples shown later in this disclosure represent fields $GF(2^k)$ as the data encrypted is usually ASCII text, which has a word size of $2^8$. For the determinant to be relatively prime to an even m, it must be odd. Constructing an invertible matrix with entries from an odd, non-prime field is less common, as all computer operations are binary. However, an invertible matrix is possible and would be useful in the p-adic space, given a computer system that operates in non-binary operations. To be invertible, the determinant of the constructed matrix must be odd. Once an invertible matrix is constructed, the algorithm can vary slightly to account for the finite field. The determinant is calculated modulo m and is then used in the Extended Euclidean Algorithm to find the inverse within the field. The adjoint matrix (transpose of the cofactor matrix) is multiplied by this value modulo m, producing B.

GEF. Galois Extension Fields can be used as a combination technique that guarantees an invertible mapping to a higher finite field. Similar techniques, which map operations on $GF(p^k)$ to a closed subset on $GF(p^{k+1})$, have been demonstrated to have substantially better diffusion and forward secrecy properties than other stream cipher and sequence combination techniques. By extending the elements to a higher field, $GF(2^k) \rightarrow GF(2^{k+1})$, they have provided an invertible mapping to only odd elements in the higher field where the issue of non-uniformity has been solved. However, in this higher field addition and subtraction are no longer closed operations as even numbers are not invertible in $GF(2^{k+1})$. The combination function is represented by Equation 4. Specifically, the function can be used when working with binary data, where $z_n$ is the ciphertext, $x_n$ is the plaintext, and $y_n$ is a discrete-time PRNG output.

$$z_n = \frac{\left((2 \ast x_n + 1) \ast (2 \ast y_n + 1) \bmod 2^{k+1}\right) - 1}{2} \quad (4)$$

Galois Extension Fields can be used as a stream cipher combination technique as an alternative to traditional methods like XOR. Additionally, they can be an effective technique for fast, power-efficient stream cipher encryption in IoT devices. This technique is extended to be usable as a block cipher by constructing an upper right triangular matrix with outputs from a PRNG in $GF(2^k)$. When working in a Galois field space of order $2^k$, the matrix determinant needs to be odd for it to be invertible. The constructed matrix is upper right triangular as this makes the determinant only a product of the diagonal elements, meaning all elements in the diagonal need to be odd themselves. Since the elements of the matrix are being filled by a uniform PRNG, the probability of every element in the diagonal being odd and non-zero is $$\left(\frac{p-1}{p}\right)^n.$$

For a realistically sized matrix, such as n=16 or 32, the probability is very small, and GEF transformations can be used to guarantee invertibility. Rather than discarding every constructed matrix that does not meet these requirements, the elements within the matrix can be mapped to odd elements in a higher field, which forms a closed subset on $GF(p^{k+1})$. In the case of p=2, this extension field mapping ensures all elements are bijectively mapped to the odd subset of $GF(2^{k+1})$. Not all elements within the matrix are extended since the triangular matrix needs to be preserved, as shown in the example mapping of a matrix from $GF(2^3) \rightarrow GF(2^4)$ below.

$$\begin{pmatrix} 2 & 0 \\ 0 & 7 \end{pmatrix} \rightarrow \begin{pmatrix} 5 & 1 \\ 0 & 15 \end{pmatrix}$$

Single-Stage RNS PRNG. The PRNG used to generate the elements of the matrices in this cryptosystem can be, e.g., a single-stage residue number system (RNS) based PRNG. The choice of PRNG to generate the matrix is arbitrary as long as the output generated is sufficiently strong. The RNS system was chosen because of prior work in analyzing the strength of this PRNG and its suitability in IoT use cases. An alternate PRNG may be used without limitation.

Validation Tools. The NIST statistical test suite (STS) is a standardized method for testing the strength of randomness in a cryptosystem's output. For the purpose of this disclosure, the NIST test suites was used to validate the randomness in the binary output of this system following sequence combination between the plain text and matrices generated from the RNS PRNG. The strength of the single-stage RNS PRNG has been validated using these test suites as well. Additionally, an implementation on a Texas Instruments (TI) MSP430 microcontroller is discussed below in the Hardware Validation section.

System Description

The setup of the cryptosystem that uses the tools described above, including any assumptions made and variables the user defines, will be discussed next. A high-level view is provided to show the interconnection of components in both ECB and CFB mode, along with a more thorough discussion of pieces that were developed. A toy example follows to illustrate an example of the encryption and decryption operations with real numbers.

Assumptions and Variables. There are a few assumptions that are made when using this system. The first is that the PRNG used for key generation needs to be of reasonably high quality as a potential attacker will be assumed to have complete knowledge of generation parameters except for initial conditions. While other defense strategies can be used to strengthen these PRNGs, that is not the focus of this disclosure. A single-stage RNS PRNG is chosen for key generation in this system because the quality of this PRNG has been previously validated. Since this cryptosystem is being considered for use in IoT-caliber devices where speed and efficiency are necessary requirements, the PRNG chosen needs to meet these requirements. Moreover, as a symmetric cryptosystem, both sender and receiver maintain this structure, so the computational burden needs to be low.

The user is able to define the order of the Galois Field, but this is assumed to be of order $2^k$ as the majority of data encrypted will be represented in binary. Examples provided later encrypt ASCII text in $GF(2^8)$. The PRNG used should output values that are in similar fields. The plaintext can be partitioned if necessary to fit smaller or larger fields. As mentioned above, in the case of a p-adic system, the field size can be chosen to fit this space.

The block size is dependent on the order of the square matrix, n. Larger n values increase complexity by a quadratic factor but have a trade-off with computation time when encrypting and decrypting. The relationship between block size and computation time will be discussed below. Recommendations will be given on how to define these variables to provide strong, efficient security. Padding can be used in the case that there is not enough data to fill a vector when encrypting but is never used in the case of matrix generation as the key needs to be random. Padding can be composed of any chosen value as long as the choice remains consistent for the entire session.

High-Level System View. At the start, both transmit and receive devices setup a synchronized PRNG which will be used for symmetric encryption and decryption processes. What type of PRNG used is a choice that can vary based on available computing resources such as memory usage and processing speed: a trade-off discussed below. The outputs of the PRNG can be formed into an empty matrix in an upper right triangular format, row by row. The GEF technique can be applied to the upper right triangular matrix to map all elements to an odd value in the higher-order field. The plaintext vector's elements can also be mapped to the higher-order field. Once both key and plaintext are extended to a higher field, they are combined using matrix multiplication modulo $2^{k+1}$ to produce a vector of ciphertext in the higher-order field.

In stream cipher combinations, the combination always produces an odd number, which can be reduced to the field $2^k$ through an inverse of the extension operation. However, in this block cipher application, the multiplication yields even numbers in the higher field, which is not in the closed subset in $GF(2^{k+1})$. The operation used to combine the plaintext and key can be reduced to a series of element-wise addition operations. However, addition and subtraction are not closed operations when using a GEF combination technique. Following the field reduction of the ciphertext vector, a ceiling operation is applied to bijectively map all elements to a closed subset in $GF(2^k)$. FIG. 1 depicts an example of the encryption process when operating in Electronic Codebook (ECB) mode. ECB is the standard operation of block ciphers where each block of plaintext is encrypted independently from the rest.

The decryption process is almost the reverse of the encryption process with the addition of the matrix inverse calculation. The receiving device maintains or generates the same key matrix but needs to calculate the inverse to decrypt the ciphertext (see the Single-Stage RNS PRNG Section above). Once extended to the higher order field, a floor operation is applied to the ciphertext to reverse the mapping performed during encryption. Following, the inverse matrix and ciphertext vector are combined with a matrix multiplication modulo $2^{k+1}$. The resulting vector can be reduced to $GF(2^k)$ to retrieve the original plaintext.

Figure 2:
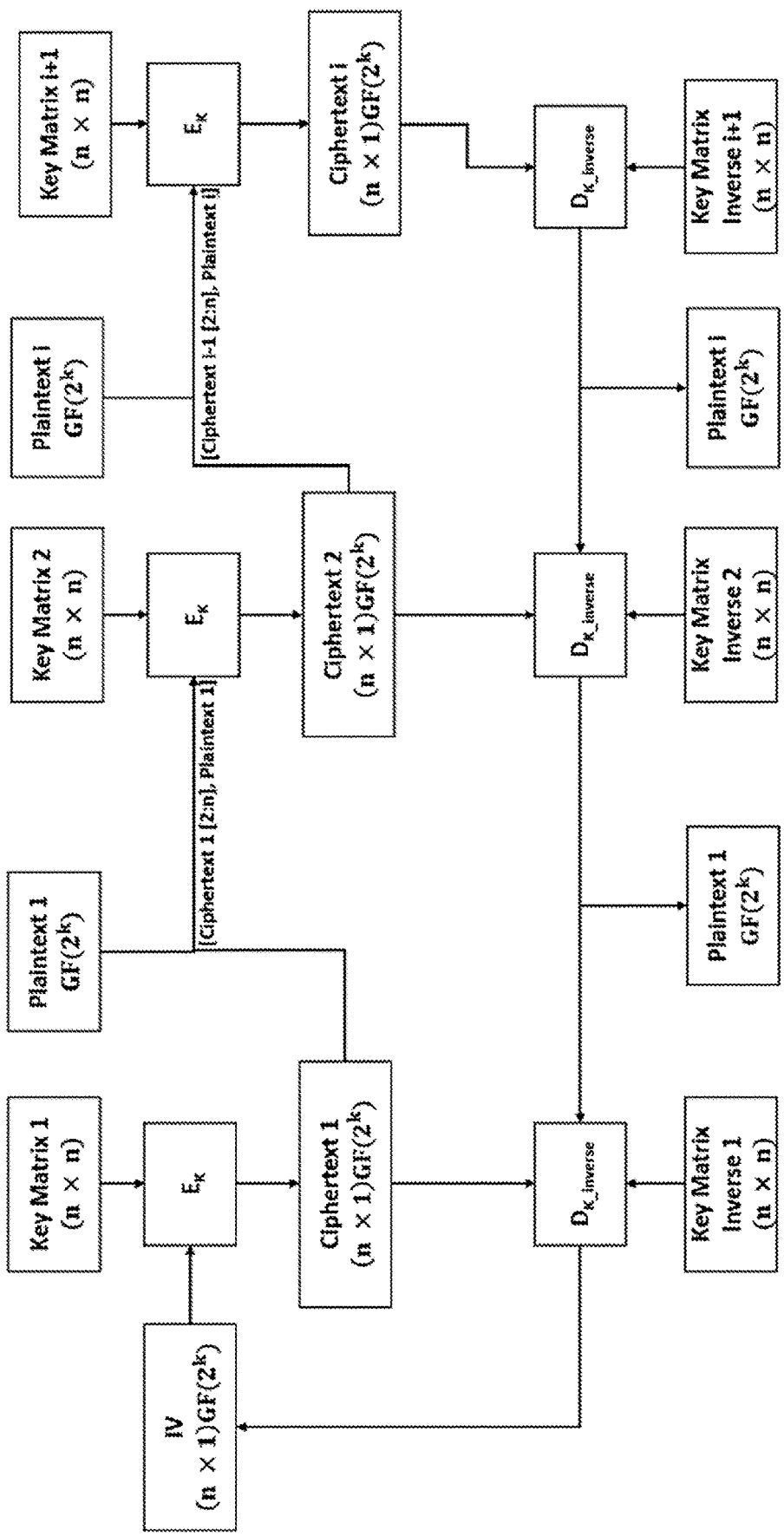
FIG. 2 illustrates an example of GEF-based encryption and decryption when operating in Cipher Block Chain (CBC) mode, in accordance with various embodiments of the present disclosure.

Modes of operation in stream/block ciphers allow for additional flexibility, increasing diffusion and confusion of the resulting ciphertext. In systems that implement Cipher Feedback Mode (CFB) or Cipher Block Chain (CBC), ciphertext from a previous iteration can be filtered back into the next encryption operation with the plaintext. Feeding ciphertext back into the encryption operations results in additional computation and slower encryption but generates a more secure ciphertext. The cryptosystem disclosed here can operate in CFB mode as well as CBC mode. Following each encryption operation, the next plaintext vector can be assigned the previous ciphertext vector shifted up one element, with one additional plaintext word appended. An illustration of CFB mode encryption and decryption is depicted in FIG. 2. Each decryption operation only retrieves a single word of plaintext. The standard mode can be parallelized in both encryption and decryption processes to increase speed, whereas CFB mode cannot.

Implementation of Galois Extension Fields in a Block Cipher. Matrices are used in this system as a block cipher combination technique on data and the outputs of a PRNG. Decrypting this needs to calculate the inverse of the matrix constructed from the PRNG. Since these values are from a Galois field, the process of calculating the inverse is different (see the Matrix and Finite Field Math Section above). Galois Extension Fields are implemented to satisfy the requirements for invertibility. An example of the process of building an invertible matrix and calculating the corresponding inverse is shown in Algorithm 1 of FIG. 3. Note that this algorithm is specifically for data that is represented in a binary space. The user inputs a size for the square matrix, the exponent for the order of the Galois field of the plaintext and PRNG values, and a sequence generator object for a selected PRNG. A is initialized to an n×n matrix of zeros. A nested loop can then iterate through all entries in the upper right of the matrix, storing an output from the PRNG in a temporary variable.

The inverse can then be computed by multiplying the inverse of the determinant in $GF(2^{k+1})$ by the adjoint of A modulo $2^{k+1}$. Rather than running the Extended Euclidean Algorithm every time to compute the inverse of the determinant, these values can be stored in a lookup table when working with reasonably sized k values (k≤16). The key matrix can then be mapped from $GF(2^{k+1})$ to $GF(2^k)$. The plaintext vector can also be extended to $GF(2^{k+1})$, but this calculation is simple and is discussed in the GEF Section above. As mentioned previously, not all resulting ciphertext values are part of the odd subset in $GF(2^{k+1})$. While this can also be solved by operating in a prime field, performing a mixed radix translation of binary data into prime field characteristics is an unnecessary computational expense. Therefore, a closed ceiling operation can be applied following field reduction of the ciphertext. The bijective mapping does not affect the randomness of the ciphertext in any way, as discussed below.

Toy Example. A toy example will now be worked out to show the encryption/decryption processes in ECB mode with sample data represented in decimal for ease in following along.

Encryption. Consider a small example in $GF(2^4)$ with a key matrix sized 3×3, where the PRNG used to generate the key $$\begin{pmatrix} 13 & 11 & 2 \\ 0 & 3 & 14 \\ 0 & 0 & 14 \end{pmatrix}$$

is a single-stage RNS (see, e.g., "A maximal entropy digital chaotic circuit" by Alan J. Michaels (2011 *IEEE International Symposium of Circuits and Systems (ISCAS)*, pp. 717-720, 2011) for setup). The plaintext vector $$\begin{pmatrix} 8 \\ 0 \\ 8 \end{pmatrix}$$

is sized 3×1 to satisfy dimension requirements when utilizing a dot product operation for encryption. The data encrypted is ASCII that is partitioned into nibbles (i.e., 4-bit data words) to fit in $GF(2^4)$. Galois Extension Fields are then applied to the plaintext vector $$\begin{pmatrix} 8 \\ 0 \\ 8 \end{pmatrix} \rightarrow \begin{pmatrix} 17 \\ 1 \\ 17 \end{pmatrix}$$

to map the plaintext to $GF(2^5)$. Galois Extension Fields are applied to every entry in the upper right of the matrix to satisfy the requirements for invertibility.

$$\begin{pmatrix} 13 & 11 & 2 \\ 0 & 3 & 14 \\ 0 & 0 & 14 \end{pmatrix} \rightarrow \begin{pmatrix} 27 & 23 & 5 \\ 0 & 7 & 29 \\ 0 & 0 & 29 \end{pmatrix}$$

Following, the plaintext is encrypted using a dot product operation with the key matrix.

$$\begin{pmatrix} 13 & 11 & 2 \\ 0 & 3 & 14 \\ 0 & 0 & 14 \end{pmatrix} \cdot \begin{pmatrix} 17 \\ 1 \\ 17 \end{pmatrix} (\mathrm{mod}\, 2^5) = \begin{pmatrix} 23 \\ 20 \\ 13 \end{pmatrix}$$

When reducing the ciphertext to the original field, a ceiling operation is applied to bijectively map all outputs to a closed subset in $GF(2^4)$.

$$\begin{pmatrix} 23 \\ 20 \\ 13 \end{pmatrix} \rightarrow \begin{pmatrix} 11 \\ 10 \\ 6 \end{pmatrix}$$

Decryption. Next, the decryption process used to retrieve the plaintext from ciphertext generated in the previous subsection is detailed. First an inverse mapping operation is applied to the ciphertext vector's elements, then extended to $GF(2^5)$.

$$\begin{pmatrix} 11 \\ 10 \\ 6 \end{pmatrix} \rightarrow \begin{pmatrix} 23 \\ 20 \\ 13 \end{pmatrix}$$

Following an extension of the key matrix to $GF(2^5)$, the determinant of the key matrix is computed modulo $2^5$. The inverse of the determinant in $GF(2^5)$ can then be found using the Extended Euclidean algorithm, or, for efficiency, retrieved from a look-up table. To generate the inverse matrix, the determinant inverse is multiplied by the adjoint matrix modulo $2^5$.

$$25 \times \begin{pmatrix} 11 & 5 & 24 \\ 0 & 15 & 17 \\ 0 & 0 & 29 \end{pmatrix} (\mathrm{mod}\, 2^5) = \begin{pmatrix} 19 & 29 & 24 \\ 0 & 23 & 9 \\ 0 & 0 & 21 \end{pmatrix}$$

Finally, the inverse matrix and ciphertext vector are combined using a dot product and reduced to the original field to retrieve the original plaintext.

$$\begin{pmatrix} 19 & 29 & 24 \\ 0 & 23 & 9 \\ 0 & 0 & 21 \end{pmatrix} \cdot \begin{pmatrix} 23 \\ 20 \\ 13 \end{pmatrix} (\mathrm{mod}\, 2^5) = \begin{pmatrix} 17 \\ 1 \\ 17 \end{pmatrix} \rightarrow \begin{pmatrix} 8 \\ 0 \\ 8 \end{pmatrix}$$

Use Cases. An upper right triangular matrix is used as the key in this cryptographic algorithm and needs $$\frac{n*(n+1)}{2}$$

outputs from PRNG to encrypt a block of n plaintext words. The system designer can draw these values from multiple PRNGs if they have enough computational power to maintain all these algorithms. Given two PRNGs, the algorithm could be modified to alternate drawing values from them to construct the key matrix. Every individual entry within the matrix can be generated by a PRNG, and they need not be the same type of PRNG as long as they produce values within $GF(2^k)$. Maintaining a PRNG for each entry of the key structure can serve as an additional layer of security since a potential attacker would need to break or discover the key for all those individual PRNGs. However, gaining access to any of the PRNGs does detract from the overall security as the remaining key values can be filled in with a brute force attack. Computing a single value in this manner would require at most $$\frac{2^k}{2}$$

guesses. Given only a single unknown, this may be trivial on modern computers, but based on transmission rates, reliance on brute force attacks can contribute significant latency if this was necessary to perform for every block of decryption by the attacker. Based on the PRNG used to generate this entry, an attacker could choose an intelligent attack to reverse engineer the key, such as the Berlekamp-Massey algorithm for an LFSR.

One exemplary application of this combination technique is for use in a multi-party cryptographic system, where entries in the key matrices are generated by different parties. To encrypt, every party can provide their own portion of the key and could not uncover any information about the plaintext without a full key. As before, each value for the key could be an independent cryptographic algorithm that outputs values in $GF(2^k)$. The encryption/decryption processes are not independent and need coordinated party effort.

Aside from the matrix generation, this cryptographic algorithm can be modified to be more efficient in decryption operations for edge nodes in an IoT network. In many cases, these nodes are battery-powered sensors or actuators that communicate with a central system with substantially more computational power. The decryption operation includes an additional step: to calculate the inverse of the key matrix. While relatively inexpensive, this needs additional energy, storage, and time. The base station could instead calculate this inverse and encrypt the plaintext with this matrix instead. The edge node would still need to maintain a synchronized PRNG but could just build the key matrix and use this as the decryption key since the matrix inverse is commutative. Encrypting with the matrix inverse results in a small decrease in entropy of the resulting ciphertext. This computationally asymmetric modification to the cryptosystem is more suitable for edge computing cases. FIG. 4 shows a comparison between the asymmetric (i.e., public key) and private key cryptosystem variants.

Analysis

The results of encrypting ASCII data with the proposed block cipher in both ECB and CFB modes will next be presented. Randomness of the resulting ciphertext can be measured through the use of statistical tools discussed in the Validation Tools Section above, as well as Shannon entropy and Law of Iterated Logarithm calculations. A discussion into diffusion follows, including measurements of decay and security concerns with repeated plaintext. Last, a comparison of memory and computational requirements between the cryptosystem modes and AES is made to illustrate the point that the proposed block cipher is a better option for IoT devices. All comparisons include metrics on the GEF stream cipher variation as an additional baseline. Confusion and other cryptographic properties generally offered in block ciphers are not included in this analysis because the proposed cryptographic algorithm does not include techniques to introduce them. The tools used to validate these results do not guarantee security to intelligent attacks. They offer a baseline measurement of strength against generic statistical attacks like frequency analysis.

Figure 5:
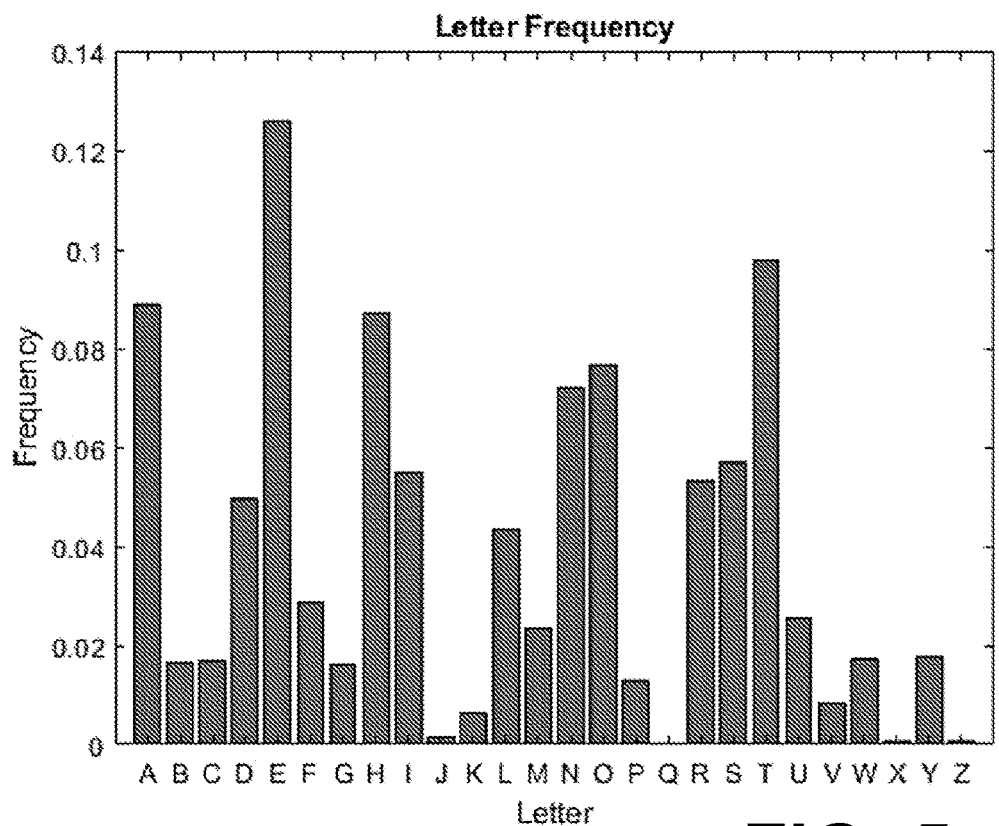
FIG. 5 is a histogram illustrating an example of frequency of characters in plaintext, in accordance with various embodiments of the present disclosure.
Figure 6A:
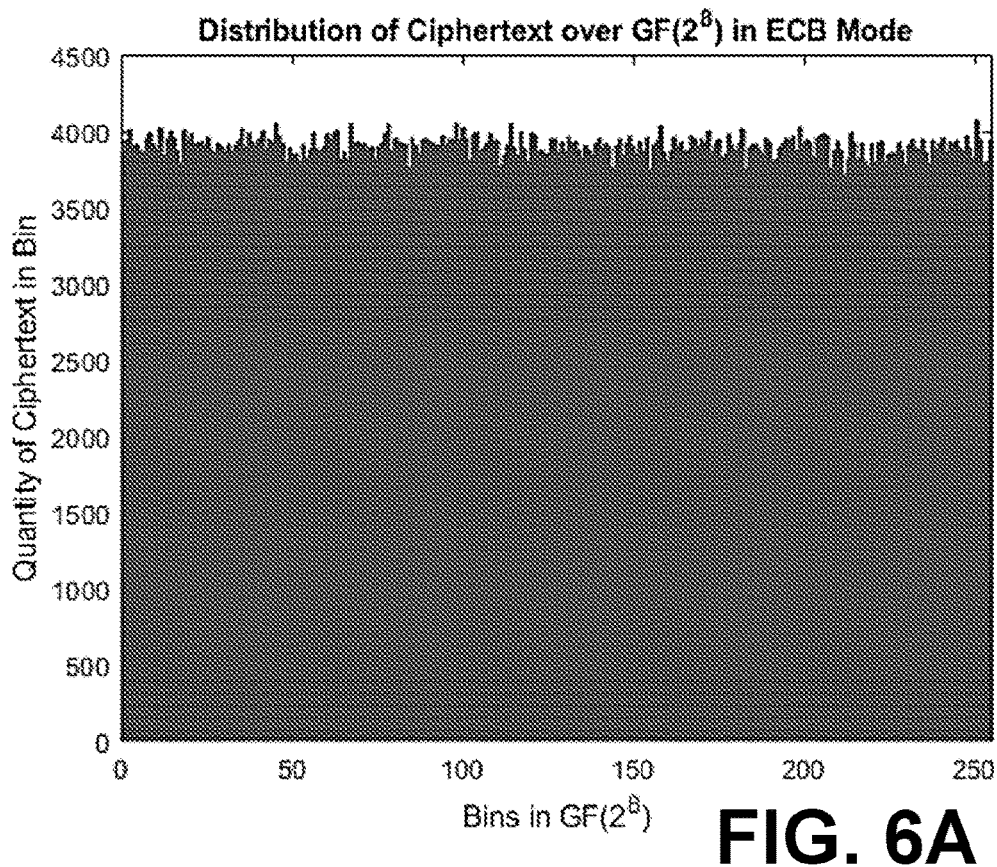
FIGS. 6A-6D illustrate examples of distributions of ciphertext in ECB, CFB and stream modes, in accordance with various embodiments of the present disclosure.
Figures 6B, 6C:
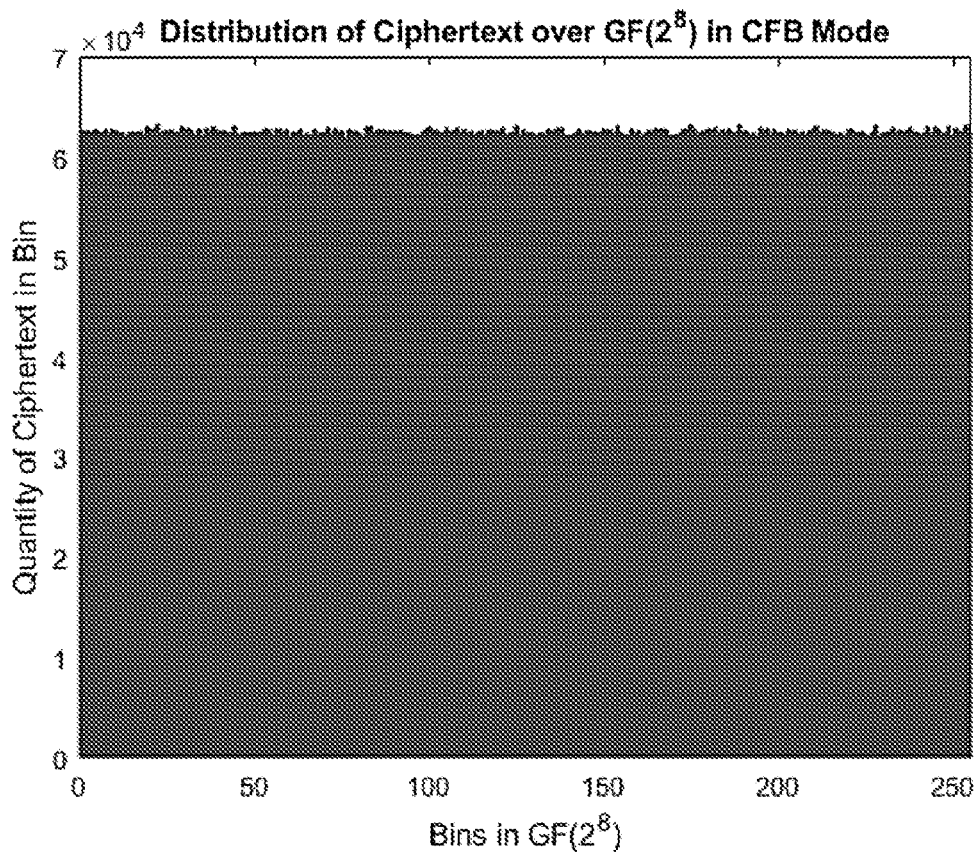

Entropy Analysis. A sample of 1,000,000 characters was used as the plaintext in a MATLAB implementation of this cryptographic algorithm. All punctuation was removed except spaces and was raised to upper case. The frequency of characters of the plaintext is displayed in a histogram in FIG. 5. A single-stage RNS PRNG was used for matrix construction, generating values in $GF(2^8)$. The matrix was sized 16×16. The distribution of the ciphertext across $GF(2^8)$ from the ECB mode is shown in FIG. 6A. The expected mean of a perfectly uniform distribution was 3906.25, with one standard deviation of 62.56. The Shannon entropy was 7.9998 bits, where the maximum entropy for this system is 8, meaning the ciphertext is almost uniformly distributed. Table 1 of FIG. 6B displays the results of the NIST STS after analyzing the generated ciphertext from this implementation. The test suite was provided 1,000,000 characters, where 1000 bitstreams 1000 bits long were chosen randomly from the pool of provided ciphertext. With a (significance) set to 0.001, 980 sequences needed to pass a specific test for the ciphertext to be considered seemingly random. Each test relevant to the cryptosystem is displayed in the Table 1 and indicates an overall success.

The same exact setup was run but using CFB mode when encrypting. The distribution of the resulting ciphertext is displayed in FIG. 6C. The Shannon entropy was 7.999 bits, which is essentially equivalent to the maximal entropy. The mean of the histogram in $GF(2^8)$ for the ciphertext is 625000 since CFB mode produces n times more ciphertext than ECB mode, and the standard deviation is 128.65. Interpreting these values, the cryptographic algorithm run in CFB mode is nearly uniformly distributed. The ciphertext was analyzed using NIST's test suite with the same parameters as the standard mode. The results are also displayed in Table 1 of FIG. 6B.

Figure 6D:
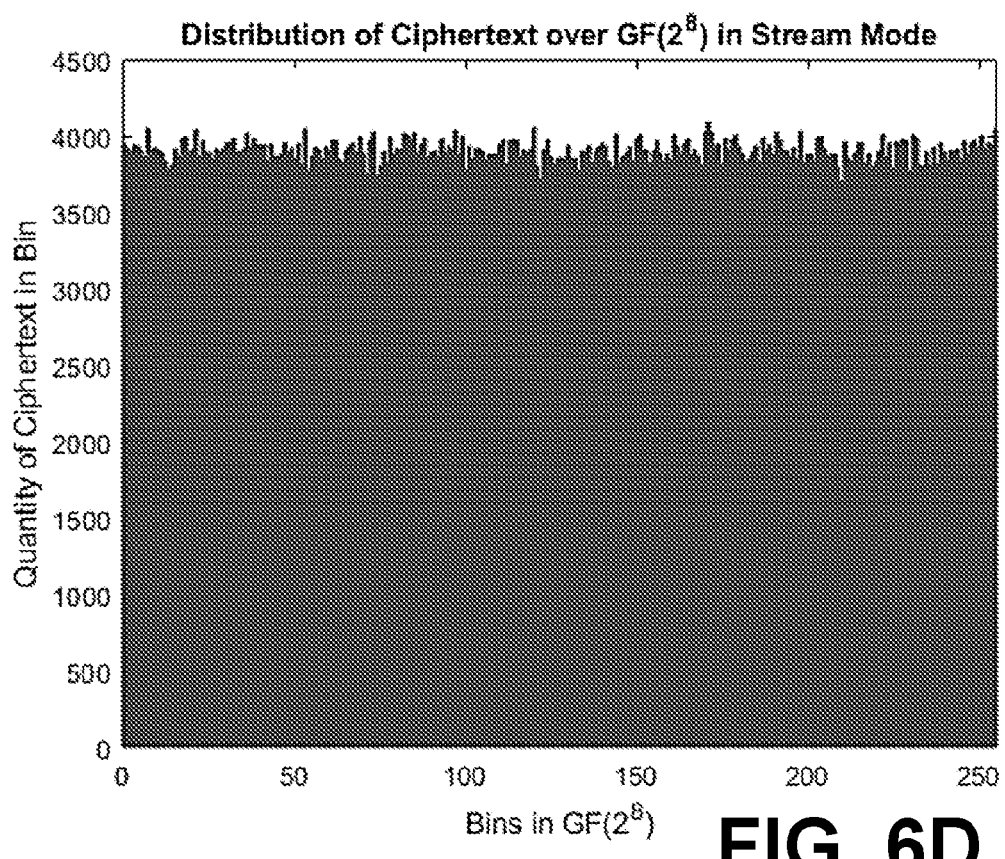

The stream cipher variation of the GEF cryptosystem from "Lightweight Internet of Things Encryption using Galois Extension Field Arithmetic" by J. M. McGinthy et al. (2018 *IEEE International Conference on Internet of Things (iThings) and IEEE Green Computing and Communications (GreenCom) and IEEE Cyber, Physical and Social Computing (CPSCom) and IEEE Smart Data (SmartData)*, pp. 74-80, 2018) was also implemented in MATLAB and used to encrypt the same plaintext as ECB mode and CBC mode, resulting in a Shannon entropy of 7.9998 bits. The distribution of the ciphertext across $GF(2^8)$, shown in FIG. 6D, indicates a mean of 3906.25 and standard deviation of 63.56. As expected, the stream and ECB modes of the cryptographic algorithm were nearly equivalent in their distribution. However, CFB mode's results indicated a more secure option due to the higher entropy and lower standard deviation for a substantially larger mean. Based on the results of the NIST test suite, all three variations of the algorithm appear seemingly random since each test passed the threshold of 98%. ECB mode outperformed the other two modes in the context of these tests.

Figure 7A:
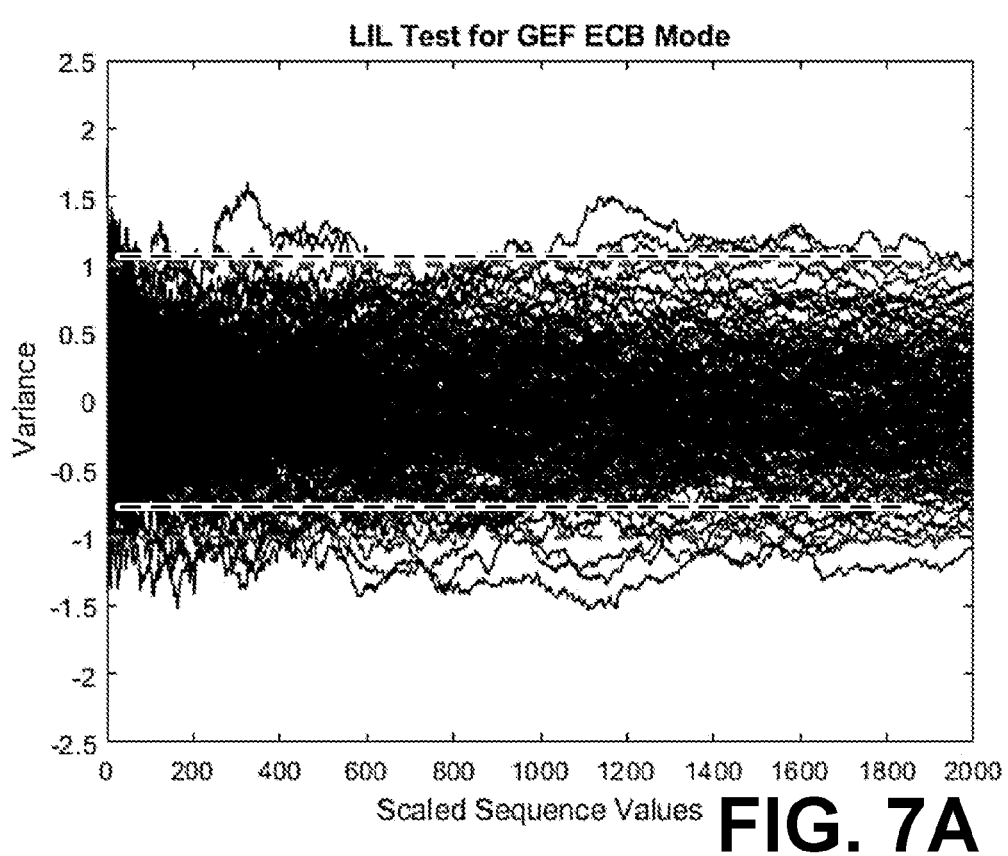
FIGS. 7A and 7B illustrate examples of variance plot resulting from Law of the Iterated Logarithm tests for ECB and CFB modes, in accordance with various embodiments of the present disclosure.
Figure 7B:
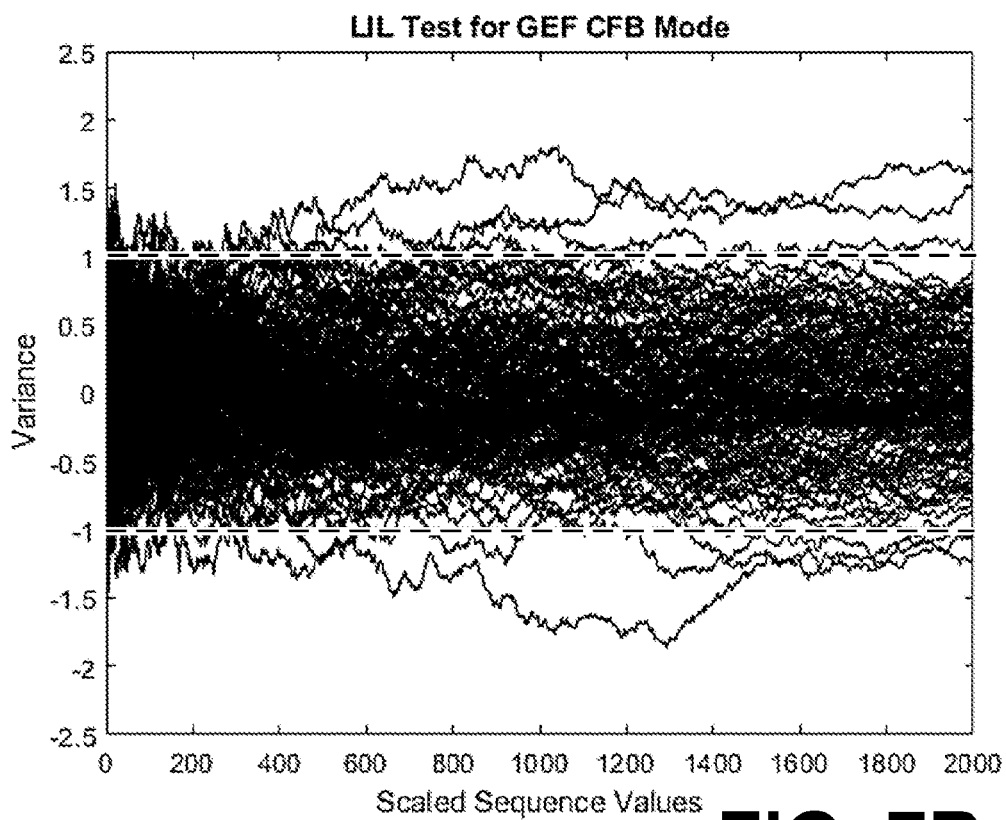

Law of the Iterated Logarithm. While the NIST test suite validates the randomness of a cryptosystem's output, the Law of the Iterated Logarithm (LIL) provides another level of confidence in the randomness of the ciphertext. Previous research indicates that some cryptographically weak systems have passed the NIST test suite but did not pass the LIL test. The test analyzes the variance of a pseudorandom string by looking at the reduced number of 1 s after a large output capture. Generally, the provided data is on the order of 226 to 234 captured outputs. Summarizing what merits a success in the LIL test, the variance must converge to the bounds [−1, 1], but still maintain a large distribution within those bounds. The tool referenced in "On statistical distance based testing of pseudo random sequences and experiments with PHP and Debian OpenSSL" by Y. Wang et al. (*Computers & Security*, 53:44-64, 2015) requires a sample ciphertext size of at least 62.5 Megabytes to accurately measure the variance. The output stream is randomly broken into smaller samples upon which three statistical metrics of distance are calculated: total variation, Hellinger, and root-mean-square deviation. If the distance values calculated from the sample ciphertext are less than accepted thresholds dependent on the sample size, the test is considered a success. FIG. 7A shows the variance plot resulting from the LIL test on the ECB mode and FIG. 7B displays the variance plot resulting from the LIL test on the CFB mode. Both of the modes pass all three distance metrics while staying within the bounds [−1, 1] with few deviations outside. As shown in FIGS. 7A and 7B, a wide distribution of variance is maintained within the bounds indicated by the dashed lines.

Figure 8:
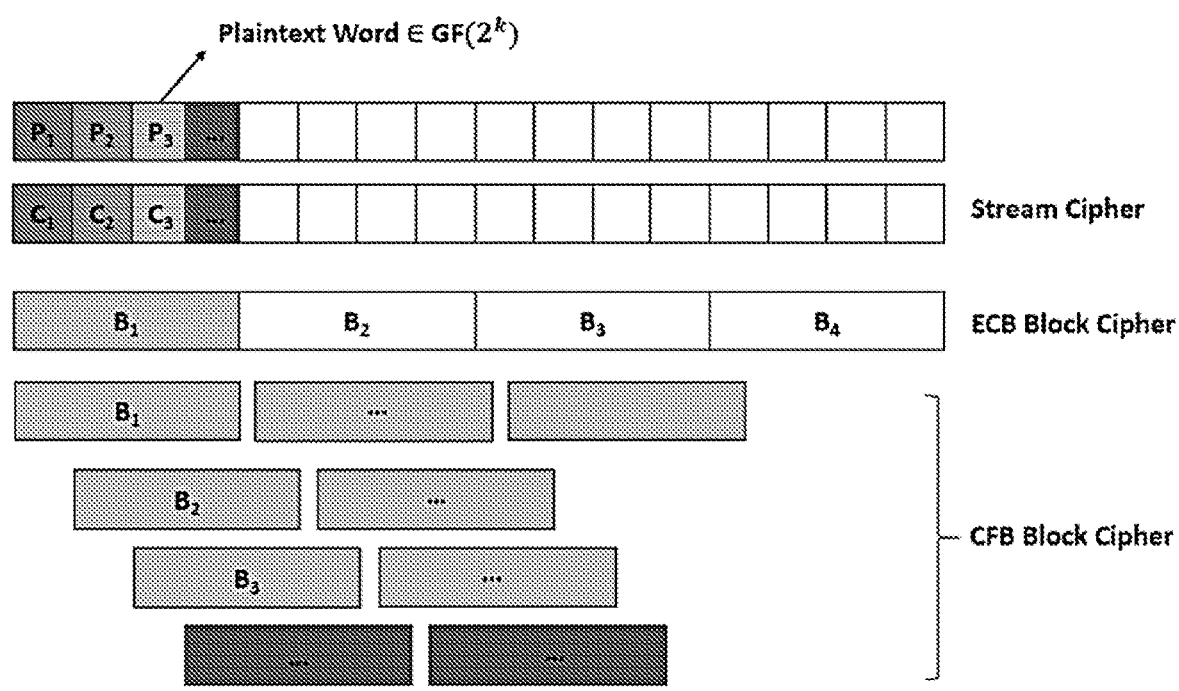
FIG. 8 illustrates an example comparing diffusion properties for ECB, CFB and stream modes, in accordance with various embodiments of the present disclosure.

Diffusion Analysis. In the stream cipher version of the GEF cryptosystem, when a bit change occurs in a plaintext word or key generated by a PRNG, the resulting diffusion is isolated to the corresponding ciphertext word. FIG. 8 illustrates examples of diffusion for each mode of the cryptosystem. Given a repeated plaintext word, the probability that a uniformly distributed PRNG, operating in $GF(2^k)$, will generate the same key for encryption is $$\frac{1}{2^k}.$$

While the probability is relatively small, given a large sample of plaintext, identical ciphertext words can occur. Intelligent attacks can then use repeated ciphertext as a clue on how to retrieve the ciphertext. To solve this problem, the stream cipher can operate in a different mode of operation that uses previous ciphertext as an encryption parameter, such as Counter (CTR) or Output Feedback (OFB) mode. In this case, diffusion would propagate throughout the remaining ciphertext. Bit errors also need to be considered when making the decision of which mode to operate in. In the standard stream cipher mode, a bit error would only result in a single ciphertext word changing, whereas an error in CTR or OFB mode would propagate through the remaining ciphertext.

Diffusion in block ciphers is different as a change in the plaintext or key results in a change in the entire block. Within the ECB mode, if a bit change in a plaintext word at index i occurs, diffusion only occurs within the corresponding ciphertext words from index i up to 0 since the combination technique utilizes a dot product with a triangular matrix. FIG. 8 shows an example of the diffusion propagation. FIG. 9A illustrates the average percentage of diffusion for different encryption key orientations taken from 1000 samples. Any change in the first n plaintext words will only result in propagation throughout the first block of ciphertext. The change does not propagate between blocks. In traditional block ciphers such as AES or 3DES, no propagation between blocks introduces security issues as a repeated message generates the same output. However, in the proposed system, the use of a PRNG with sufficiently large k (k≥8) to generate the key matrix mitigates concern as two identical blocks will not be encrypted with the same key. If, for some reason, a prime p is chosen for the field order, the key matrix need not be triangular so long as the determinant is relatively prime to p. In this case, a single bit change between two exact plaintext words with identical key matrices can result in a substantially changed ciphertext block. On the other hand, a low rate of diffusion between plaintext blocks means bit transmission errors only propagate as far as the corresponding ciphertext block. Table 2 of FIG. 9B displays the Shannon diffusion averaged from 1000 samples for different block sizes. The row indicates the block size n and the column marks the index i of the plaintext word that was changed. As mentioned earlier, using an upper right triangular matrix results in a lower rate of diffusion when a change occurs in a lower index. As the block size increases, the overall diffusion decreases with a change in index 1 since this does not propagate throughout blocks 2 through n. However, diffusion reaches the targeted 50% in every scenario when the change occurs at index n. Given smaller block sizes, n=4, a system can still meet an acceptable rate of diffusion.

Since the CFB mode reuses the ciphertext as a variable in the next iteration of encryption with only a single new plaintext value, diffusion propagates from the current block to further blocks before eventually decaying out. How far the change propagates depends on which word in the plaintext vector is modified, as the lower down it is the farther this change propagates. A small change propagating is great for diffusion when identical blocks with a single bit change are encrypted. The plaintext word would be encrypted through n blocks and contribute to increased diffusion in following blocks. However, an increase in diffusion indicates a larger impact when errors occur. A single bit error would result in incorrect plaintext, following decryption, in each block after the location of the error. Since the ciphertext vector shifts out a word with each iteration of encryption, the diffusion eventually decays. An example of this can be seen in FIG. 9A. The change made in plaintext word one does not propagate to the second ciphertext block, the change made in plaintext word two only propagates to ciphertext blocks one and two, and so forth.

Further research on triangular matrices as a key has proven that the inverse of a lower left triangular matrix with entries from a finite field can be computed using Algorithm 1 of FIG. 3. The direction of diffusion in the ciphertext vector is completely dependent upon the type of triangular matrix used as a key since the operator used for encryption is a dot product. In an upper right triangular matrix, ciphertext words at index i are a result of n−i plaintext combinations; in a lower left matrix, ciphertext words at index i are a result of i plaintext combinations. Diffusion propagates to lower index words in an upper right matrix and the opposite with a lower left matrix. To achieve a constant rate of diffusion while maximizing entropy, a system designer can alternate key construction between an upper right and lower left triangle. Alternatively, a synchronized PRNG between the sending and receiving devices can make this decision. FIG. 10 illustrates an example of an alternating key matrix construction to achieve maximal diffusion. By alternating, diffusion need not be restricted to one direction when propagating throughout the resulting ciphertext. Implementing this process does need maintenance of another synchronized PRNG between the transmit and receive devices.

FIG. 9A shows a comparison of diffusion rate when encrypting with different types of keys. Line 903 represents diffusion rate when encrypting with upper right triangular keys, line 906 represents lower left triangular keys, and line 909 is when the key structure alternates. Line 912 indicates the targeted diffusion rate of 50%. The displayed percentages are averaged over 1000 samples where the x-axis indicates the index of the plaintext word modified by a single bit in each block. As expected, upper right triangular keys result in higher diffusion at greater indices, whereas using lower left triangular keys results in the inverse. Alternating between the two every other encryption operation results in a constant rate of diffusion. Note that these are measurements based off a single bit change per block. To achieve a targeted Shannon diffusion rate of 50%, more changes can be induced in the plaintext.

Memory and Computation Requirements. Next, the memory and computation requirements are analyzed for the ECB, CFB, and stream modes. Scalability is considered, and parameters for real-world applications are recommended.

The use of the PRNG is relevant as maintaining this structure contributes to the overall memory space used and computation time.

Memory and computation requirements for ECB mode of the cryptosystem are substantially less than CFB. For a matrix sized n×n, the total memory necessary to construct all key matrices in GF($2^k$) is given by $$\frac{\text{plaintext\_length} * (n+1) * k}{2} \text{ bits}$$

where $$\text{plaintext\_length} = \frac{\text{\# of bits in } plaintext}{k}$$

Each plaintext word is encrypted exactly once in ECB mode. Overall, the mode requires only $$\frac{\text{\# of } plaintext/ciphertext \text{ words}}{n}$$

encryption or decryption operations to build the ciphertext or retrieve the plaintext.

In CFB mode, the option for an initialization vector (IV) is provided and can be generated by the key PRNG. Without using one, every plaintext word in the first block from index, i, 1 to n−1 is encrypted i number of times. Every subsequent plaintext word is encrypted n times. The use of an initialization vector ensures every value of plaintext is encrypted n times. With the inclusion of an IV, the number of PRNG outputs needed to construct sufficient key matrices is given by $$\frac{\text{plaintext\_length} * n * (n+1)}{2}$$

The amount of ciphertext generated is given by $$\text{plaintext\_length} * n \text{ bits}$$

The total ciphertext generated is n times more than in the standard mode, but a very small increase in entropy and a more uniformly distributed output, as seen in the Entropy Analysis Section above.

While in ECB or stream mode, the amount of memory generated by the encryption process is equivalent to the amount of plaintext. However, the stream cipher requires only as many PRNG outputs as there are plaintext words. The trade-off here is between diffusion rate and PRNG maintenance. CFB mode generates substantially larger amounts of ciphertext than the given plaintext. A maximum practical size for an IoT caliber platform is likely on the order of GF($2^8$) with n=16 or 32. Keep in mind that during the encryption and decryption operations, all values are extended to a higher field, needing additional space to temporarily store these values. The PRNG outputs used to construct the matrices can be recycled as soon as they are used, but the computational requirements of this cryptosystem need to be considered.

Hardware Validation. To measure the speed and energy efficiency of this cryptosystem, an implementation was built on a TI MSP430FR5994. The microcontroller chosen to implement the proposed system represents many modern IoT devices, as the device only has 256 KB of ferroelectric random access memory (FRAM), 8 KB of RAM, and a 16 MHz processor. The microcontroller was chosen to remain consistent with the device used in the stream cipher implementation. The program utilized 3% of the device's RAM and 9% of the available FRAM when fully optimized by the compiler. To measure scalability, the cryptosystem was set up to encrypt ASCII text, GF($2^8$), with parameter n=4. The key matrix was generated by the same single-stage RNS PRNG used in CPU implementation with a period of M=14,429,764,351. Time and energy usage during encryption and decryption operations was recorded and averaged from 1000 samples in both ECB and CFB modes, as well as AES. These results are compiled in Table 3 of FIG. 11. The measured results for the stream cipher's encryption is gathered from previous work. While details on the decryption operation are not provided and are not displayed in the table of FIG. 11, the time and energy required would be about the same.

ECB mode needed substantially less time and energy for both encryption and decryption than AES, but encrypted a smaller block size. The CFB mode implementation started with a randomly generated initialization vector and encrypted the same plaintext as the ECB experiment. Encrypting all the plaintext used n more operations, contributing to larger time and energy requirements. Decryption operations involve calculating the adjoint of a matrix. The algorithm to do so is almost equivalent to calculating the inverse of a matrix, which has a complexity of O($n^3$). As a result, decrypting the ciphertext in both ECB and CFB modes takes much longer and uses more energy. The system does not scale well on IoT devices when considering values of n and k that would encrypt equivalent amounts of data per block compared to AES. However, the system can encrypt and decrypt more efficiently when operation on smaller block sizes, n≤4.

The Galois Extension Field combination technique has been modified to work as a block cipher in both ECB and CFB modes. Results displayed in Analysis Section validate randomness and uniformity of the resulting ciphertext using the NIST statistical test suite as well as the Law of the Iterated Logarithm. The proposed system relies on the use of triangular matrices and PRNGs for both encryption and decryption operations, resulting in easy construction of keys and operation when generating ciphertext or retrieving plaintext. The orientation of the key structure is flexible and can be operated in both upper right or lower left triangular format to maximize diffusion and entropy. An implementation of the cryptosystem on a Texas Instruments MSP430FR5994 indicates the system offers a fast, power-efficient alternative to AES on an IoT caliber device. Measurements of energy usage and speed for both encryption and decryption operations show the system is scalable for relatively small values of n. Encryption takes substantially less time since decryption includes computing the inverse of the key matrix. While the block size in realistic applications is smaller than AES, the resulting ciphertext maintains strong cryptographic properties, such as a high rate of Shannon diffusion. Optionally, the cryptographic algorithm can be run asymmetrically to support edge computing scenarios, placing the higher load of the cryptosystem on a more powerful device. A time-varying S-box may be implemented to include a method of confusion. Based on research into matrix inverses in finite fields, non-square matrices could tie into a cheap hashing system, checksum, or signature process for the plaintext. Optimization of the hardware implementation can further improve performance for larger block sizes.

Figures 11, 12:
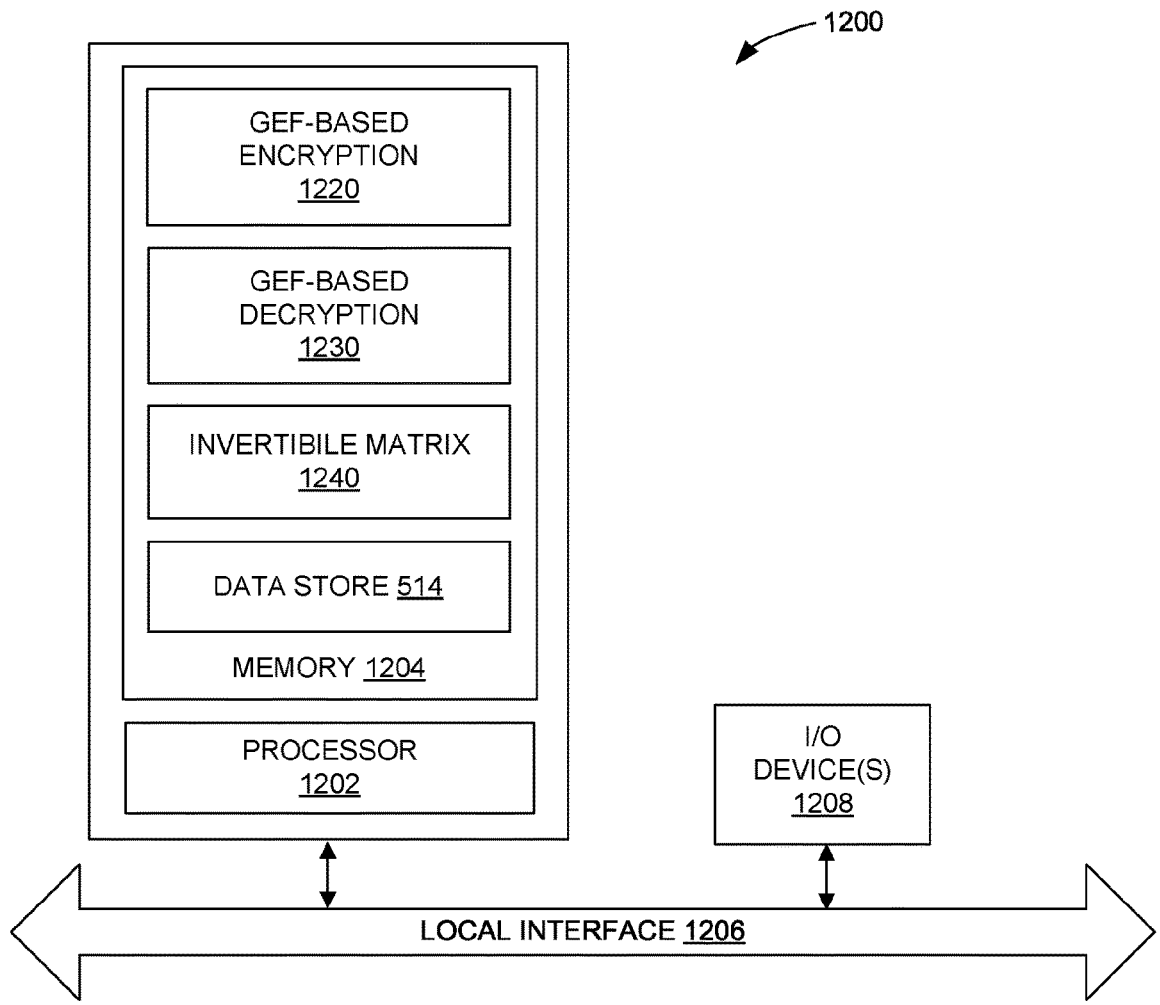
FIG. 11 illustrates an example of computation time and energy consumption, in accordance with various embodiments of the present disclosure.
FIG. 12 is a schematic block diagram illustrating an example of a computing device that can be used to implement various aspects of the present disclosure.

In various embodiments, system components can be part of a single computing device or part of multiple computing devices, such as an IoT or distributed computing system or systems that are coupled via a local or network interface with other system components. Accordingly, FIG. 12 provides a schematic of a computing device 500 that can be used to implement various embodiments of the present disclosure. An exemplary computing device 1200 includes at least one processor circuit, for example, having a processor (e.g., CPU, microprocessor, discrete logic circuits, application specific integrated circuits (ASICs), and/or programmable logic devices (e.g., field-programmable gate array (FPGAs) or complex programmable logic devices (CPLDs), etc.) 1202 and a memory 1204, both of which are coupled to a local interface 1206, and one or more input and output (I/O) devices 1208. The local interface 1206 may comprise, for example, a data bus with an accompanying address/control bus or other bus structure as can be appreciated.

Stored in the memory 1204 are both data and several components that are executable by the processor 1202. In particular, stored in the memory 1204 and executable by the processor 1202 of computing device 1200 and/or across multiple computing devices are a GEF-based encryption application or module 1220, a GEF-based decryption application or module 1232, an invertible matrix application or module 1240, and/or other applications or modules, in accordance with various embodiments of the present disclosure. Also stored in the memory 1204 may be a data store 1214, and/or other data. One or more data stores 1214 of computing device 1200 and/or multiple computing devices can include a database of PRNG outputs, lookup tables, and/or potentially other data. In addition, an operating system may be stored in the memory 1204 and executable by the processor 1202. The I/O devices 1208 may include input devices, for example but not limited to, a keypad, touchscreen, etc. Furthermore, the I/O devices 1208 may also include output devices, for example but not limited to, a display, etc. Also, the I/O devices 1208 may include a communication component, such as a network adapter or interface (e.g., WiFi network adapter, Bluetooth adapter, 4G wireless adapter, ethernet adapter, etc.), that allows for wired or wireless communications with external devices and networks.

The embodiments can be embodied or implemented in hardware, software, or a combination of hardware and software. If implemented in hardware, the embodiments can include at least one processing circuit, with at least one storage or memory device. The at least one processing circuit can include, for example, one or more processors and one or more storage or memory devices coupled to a local interface. The local interface can include, for example, a data bus with an accompanying address/control bus or any other suitable bus structure. The storage or memory device can store data or components that are executable by the processors of the processing circuit.

In another example, if implemented in hardware, the embodiments can include as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, and/or programmable logic devices (e.g., field-programmable gate array (FPGAs), and complex programmable logic devices (CPLDs)).

If implemented in software, each step or element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system.

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

This disclosure has presented a block cipher adaptation of the Galois Extension Fields (GEF) combination technique for PRNGs and targets application in the Internet of Things (IoT) space, an area where the combination technique has been concluded as a quality stream cipher. Electronic Codebook (ECB) and Cipher Feedback (CFB) variations of the cryptographic algorithm were discussed. Both modes offer computationally efficient, scalable cryptographic algorithms for use over a simple combination technique like XOR. The cryptographic algorithm relies on the use of quality PRNGs but adds an additional layer of security while preserving maximal entropy and near-uniform distributions. The use of matrices with entries drawn from a Galois field extends this technique to block size chunks of plaintext, increasing diffusion, while only requiring linear operations that are quick to perform. The process of calculating the inverse differs only in using the modular inverse of the determinant, but this can be expedited by a look-up table. This GEF block cipher was validated with the NIST test suite. Additional statistical tests indicate the condensed plaintext results in a near-uniform distributed ciphertext across the entire field. The block cipher implemented on an MSP430 offers a faster, more power-efficient alternative to the Advanced Encryption Standard (AES) system. This cryptosystem is a secure, scalable option for IoT devices that must be mindful of time and power consumption.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A Galois Extension Field-based block encryption process, comprising:
    synchronizing a random number generator (RNG), wherein the RNG is a pseudo-random number generator (PRNG);
    forming an output from the PRNG into a key matrix, wherein the key matrix is formatted as an invertible square matrix;
    applying a Galois Extension Field (GEF) operation to the key matrix, to map elements of the key matrix from a Galois field space order $GF(p^k)$, where p is a prime number, to a closed subset in a higher-order Galois extension field space;
    mapping plaintext to a plaintext matrix;
    applying the GEF operation to the plaintext matrix, to map elements of the plaintext matrix from the order $GF(p^k)$ to the higher-order Galois extension field space;
    combining the plaintext matrix and the key matrix using extension field matrix multiplication, to produce a vector of ciphertext in the higher-order Galois extension field space;
    reducing the vector of ciphertext from the higher-order Galois extension field space to a reduced vector of ciphertext in the order $GF(p^k)$ using an inverse of the GEF operation; and
    during the reducing, applying a ceiling operation to bijectively map elements in the reduced vector of ciphertext to a closed subset in the order $GF(p^k)$.

2. The encryption process according to claim 1, wherein the higher-order Galois extension field space is of order $GF(p^{k+1})$.

3. The encryption process according to claim 2, wherein p is 2 and the process further comprises optimizing subsequent Galois Extension Field computations in a digital computational framework to an odd subset of $GF(2^{k+1})$.

4. The encryption process according to claim 1, further comprising partitioning the plaintext to conform to a block size for encryption.

5. The encryption process according to claim 1, further comprising padding the plaintext to conform to a block size.

6. The encryption process according to claim 1, further comprising operating the process in Electronic Codebook (ECB) mode.

7. The encryption process according to claim 1, further comprising operating the process in Cipher Feedback Mode (CFB).

8. The encryption process according to claim 1, further comprising operating the process in Cipher Block Chain (CBC) mode.

9. The encryption process according to claim 1, wherein the key matrix is selected as an upper triangular square matrix or a lower triangular square matrix.

10. The encryption process according to claim 9, wherein the key matrix is (a) alternated, (b) randomly selected between upper and lower triangular matrices between code blocks, or (c) a composition of upper and lower triangular matrices.

11. A Galois Extension Field-based block decryption process, comprising:
    synchronizing a random number generator (RNG), wherein the RNG is a pseudo-random number generator (PRNG);
    forming an output from the PRNG into a key matrix, wherein the key matrix is formatted as an invertible square matrix;
    applying a Galois Extension Field (GEF) operation to the key matrix, to map elements of the key matrix from a Galois field space order $GF(p^k)$, where p is a prime number, to a closed subset in a higher-order Galois extension field space;
    inverting the key matrix to an inverted key matrix;
    extending a vector of ciphertext from the order $GF(p^k)$ to the higher-order Galois extension field space using the GEF operation;
    combining the vector of ciphertext and the inverted key matrix using extension field matrix multiplication, to produce a vector of plaintext in the higher-order Galois extension field space; and
    reducing the vector of plaintext from the higher-order Galois extension field space to the order $GF(p^k)$ using an inverse GEF operation.

12. The decryption process according to claim 11, wherein the higher-order Galois extension field space is of order $GF(p^{k+1})$.

13. The decryption process according to claim 12, wherein p is 2 and the process further comprises optimizing subsequent Galois Extension Field computations in a digital computational framework to an odd subset of $GF(2^{k+1})$.

14. The decryption process according to claim 13, comprising, after the reducing, applying a floor operation to bijectively map elements in the vector of plaintext to a closed subset in the order $GF(2^k)$.

15. The decryption process according to claim 11, further comprising removing padding from recovered plaintext.

16. The decryption process according to claim 11, further comprising operating the process in Electronic Codebook (ECB) mode.

17. The decryption process according to claim 11, further comprising operating the process in Cipher Feedback Mode (CFB).

18. The decryption process according to claim 11, further comprising operating the process in Cipher Block Chain (CBC) mode.

19. The decryption process according to claim 11, wherein the key matrix is selected as an upper triangular square matrix or a lower triangular square matrix.

20. The decryption process according to claim 19, wherein the key matrix is (a) alternated, (b) randomly selected between upper and lower triangular matrices between code blocks, or (c) a composition of upper and lower triangular matrices.

21. A Galois Extension Field-based block encryption system, comprising:
  at least one processing device; and
  at least one memory device that stores computer-readable instructions thereon that, when executed by the at least one processing device, direct the at least one processing device to:
    synchronize a random number generator (RNG), wherein the RNG is a pseudo-random number generator (PRNG);
    form an output from the PRNG into a key matrix, wherein the key matrix is formatted as an invertible square matrix;
    apply a Galois Extension Field (GEF) operation to the key matrix, to map elements of the key matrix from a Galois field space order $GF(p^k)$, where p is a prime number, to a closed subset in a higher-order Galois extension field space;
    map plaintext to a plaintext matrix;
    apply a GEF operation to the plaintext matrix, to map elements of the plaintext matrix from the order $GF(p^k)$ to the higher-order Galois extension field space;
    combine the plaintext matrix and the key matrix using extension field matrix multiplication, to produce a vector of ciphertext in the higher-order Galois extension field space;
    reduce the vector of ciphertext from the higher-order Galois extension field space to a reduced vector of ciphertext in the order $GF(p^k)$ using an inverse of the GEF operation; and
    during the reduction of the vector of ciphertext, apply a ceiling operation to bijectively map elements in the reduced vector of ciphertext to a closed subset in the order $GF(p^k)$.

22. A Galois Extension Field-based block decryption system, comprising:
  at least one processing device; and
  at least one memory device that stores computer-readable instructions thereon that, when executed by the at least one processing device, direct the at least one processing device to:
    synchronize a random number generator (RNG), wherein the RNG is a pseudo-random number generator (PRNG);
    form an output from the PRNG into a key matrix, wherein the key matrix is formatted as an invertible square matrix;
    apply a Galois Extension Field (GEF) operation to the key matrix, to map elements of the key matrix from a Galois field space order $GF(p^k)$, where p is a prime number, to a closed subset in a higher-order Galois extension field space;
    invert the key matrix to an inverted key matrix;
    extend a vector of ciphertext from the order $GF(p^k)$ to the higher-order Galois extension field space using the GEF operation;
    combine the vector of ciphertext and the inverted key matrix using extension field matrix multiplication, to produce a vector of plaintext in the higher-order Galois extension field space; and
    reduce the vector of plaintext from the higher-order Galois extension field space to the order $GF(p^k)$ using an inverse GEF operation.

\* \* \* \* \*